(12) United States Patent
Glenn et al.

(10) Patent No.: US 8,263,202 B2
(45) Date of Patent: Sep. 11, 2012

(54) FILM BASED HEATING DEVICE AND METHODS RELATING THERETO

(76) Inventors: Danny E. Glenn, Circleville, OH (US); Thomas Edward Carney, Orient, OH (US)

( * ) Notice: Subject to any disclaimer, the term of this patent is extended or adjusted under 35 U.S.C. 154(b) by 326 days.

(21) Appl. No.: 12/727,845

(22) Filed: Mar. 19, 2010

(65) Prior Publication Data

US 2011/0229680 A1   Sep. 22, 2011

(51) Int. Cl.
*B32B 27/20*  (2006.01)
*B32B 3/02*   (2006.01)
*B32B 15/088* (2006.01)

(52) U.S. Cl. ........ 428/68; 428/411.1; 428/457; 428/458

(58) Field of Classification Search .............. 428/68, 428/457, 458, 411.1
See application file for complete search history.

(56) References Cited

U.S. PATENT DOCUMENTS

| | | | |
|---|---|---|---|
| 3,359,525 | A | 12/1967 | Hubbuch |
| 5,021,129 | A | 6/1991 | Arbach et al. |
| 5,298,331 | A | 3/1994 | Kanakarajan et al. |
| 5,358,782 | A | 10/1994 | Parish |
| 5,411,765 | A | 5/1995 | Kanakarajan et al. |
| 7,348,080 | B2 | 3/2008 | Kanakarajan |
| 2006/0127686 | A1 | 6/2006 | Meloni |
| 2007/0007267 | A1 | 1/2007 | Rayl et al. |
| 2007/0231568 | A1 | 10/2007 | Kanakarajan |
| 2007/0231588 | A1 | 10/2007 | Kanakarajan et al. |

FOREIGN PATENT DOCUMENTS

| | | |
|---|---|---|
| EP | 0 474 054 A2 | 3/1992 |
| JP | 1997040922 | 2/1997 |
| JP | 2002086465 | 3/2002 |
| JP | 2005035729 | 11/2005 |
| JP | 2007001173 | 1/2007 |
| JP | 2007091803 | 4/2007 |
| JP | 2007 169494 A | 7/2007 |
| JP | 2007223205 | 9/2007 |
| JP | 2008024763 | 2/2008 |
| JP | 2008188893 | 8/2008 |
| JP | 2008200557 | 9/2008 |
| JP | 2008222925 | 9/2008 |
| JP | 2008238483 | 10/2008 |
| JP | 2009018522 | 1/2009 |
| WO | WO 2008/122043 A1 | 10/2008 |
| WO | WO 2010/101822 A1 | 9/2010 |

OTHER PUBLICATIONS

PCT International Search Report, Aug. 31, 2011.
JP 2007 169494 A, Toray Du Pont KK, Jul. 5, 2007, Abstract.

*Primary Examiner* — Brent Ohern (57) ABSTRACT

The present disclosure relates to a film heating device, having even heating, for high temperature long term use. The film based heating device of the present disclosure has a base film and at least a first and second laminate. The base film comprises a base film aromatic polyimide and a base film electrically conductive filler. The first laminate and second laminate each have an adhesive layer and a metal foil. The adhesive layers contain a thermoplastic polyimide and electrically conductive filler. The thermoplastic polyimide is derived from at least one aromatic diamine and at least one aromatic dianhydride.

19 Claims, 2 Drawing Sheets

FILM BASED HEATING DEVICE AND METHODS RELATING THERETO

FIELD OF DISCLOSURE

The field of this disclosure is film based heating devices, where heat is produced along a surface of a film.

BACKGROUND OF THE DISCLOSURE

Metal pastes have been used to create resistive heating elements supported by temperature resistant films. Such compositions can be problematic however, because the metal paste derived heating element can flex crack, flake or otherwise degrade over time, and exhibit undesirable voltage drift (drop) along their length. A need exists for a film based heating technology, having advantages over such metal paste derived film heating systems.

BRIEF DESCRIPTION OF THE DRAWINGS

The invention is illustrated by way of example and not limitation in the accompanying figures.

SUMMARY

The present disclosure is directed to a film based heating device. The film based heating device of the present disclosure includes a base film having a base film inner surface and a base film outer surface. The base film comprises a base film aromatic polyimide in an amount from 55 to 90 weight percent based upon the total weight of the base film, and a base film electrically conductive filler in an amount from 10 to 45 weight percent based upon the total weight of the base film.

The film based heating device of the present disclosure includes a first laminate comprising a first laminate adhesive layer having a first laminate adhesive layer inner surface bonded to the base film inner surface and a first laminate adhesive layer outer surface. The first laminate adhesive layer contains 55 to 90 weight percent of a first laminate adhesive layer thermoplastic polyimide, wherein 70 to 100 mole percent of the first laminate adhesive layer thermoplastic polyimide is derived from at least one aromatic diamine and at least one aromatic dianhydride, based upon the total weight of the first laminate adhesive layer. The first laminate adhesive layer contains 10 to 45 weight percent of a first laminate adhesive layer electrically conductive filler based upon the total weight of the first laminate adhesive layer. The first laminate includes a first laminate metal foil having a first laminate metal foil inner surface bonded to the first laminate adhesive layer outer surface; and a first laminate metal foil outer surface. The first laminate metal foil has a thickness from 5 to 200 microns.

The film based heating device of the present disclosure includes a second laminate comprising a second laminate adhesive layer having a second laminate adhesive layer inner surface bonded to the base film inner surface and a second laminate adhesive layer outer surface. The second laminate adhesive layer contains 55 to 90 weight percent of a second laminate adhesive layer thermoplastic polyimide, wherein 70 to 100 mole percent of the first laminate adhesive layer thermoplastic polyimide is derived from at least one aromatic diamine and at least one aromatic dianhydride, based upon the total weight of the second laminate adhesive layer. The second laminate adhesive layer contains 10 to 45 weight percent of a second laminate adhesive layer electrically conductive filler based upon the total weight of the second laminate adhesive layer. The second laminate includes a second laminate metal foil having a second laminate metal foil inner surface bonded to the second laminate adhesive layer outer surface and a second laminate metal foil outer surface. The second laminate metal foil has a thickness from 5 to 200 microns. At least a portion of the first laminate and at least a portion of the second laminate are spaced apart and connected to each other by at least a portion of the base film.

DETAILED DESCRIPTION

Definitions

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only to those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

The term "dianhydride" as used herein is intended to include precursors, derivatives or analogs thereof, which may not technically be a dianhydride but would nevertheless react with a diamine to form a polyamic acid which could in turn be converted into a polyimide.

The term "diamine" as used herein is intended to include precursors, derivatives or analogs thereof, which may not technically be a diamine but would nevertheless react with a dianhydride to form a polyamic acid which could in turn be converted into a polyimide.

The term "polyamic acid" as used herein is intended to include any polyimide precursor material (prepolymer) derived from a combination of dianhydride and diamine and capable of conversion to a polyimide via a chemical or thermal conversion process.

The term "high temperature" as used herein is intended to include temperatures of 200 degrees centigrade or above.

The term "long term" as used herein is intended to include at total of 50 hours or more. The 50 hours or more may be cumulative (for example a few hours at a time and over several uses to total 50 or more hours) or continuous.

The term "adhered", "adhesion" or any other variation thereof is synonymous with "bonded" or "bonding" and the terms may be used interchangeably. "Directly adhered" is intended to cover two layers (films) directly attached to one another with out any intervening layers unless otherwise stated.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

The materials, methods, and examples herein are illustrative only and, except as specifically stated, are not intended to be limiting. Although methods and materials similar or equivalent to those described herein can be used in the practice or testing of the present invention, suitable methods and materials are described herein.

The present disclosure is directed to a heating device. The heating device is a high temperature film based heating device having even heating for long term or repetitive use.

Figure 1:
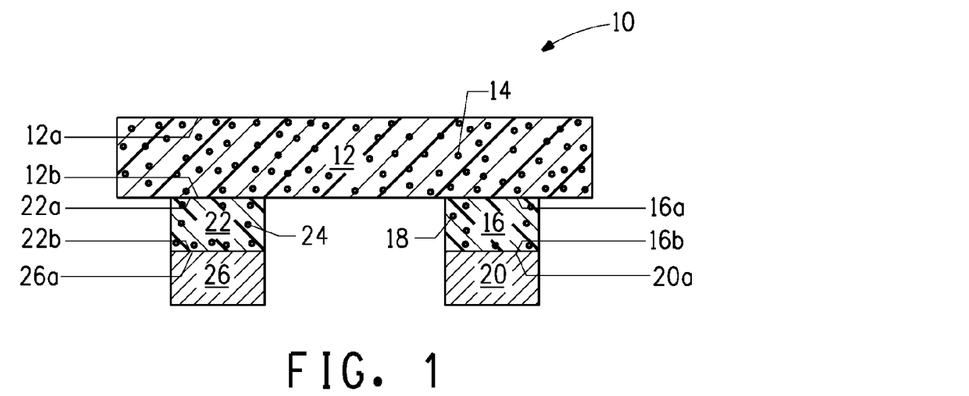
FIG. 1 is a cross-sectional drawing of a portion of a film based heating device having a base film, a first laminate and a second laminate.

Referring to the figures, FIG. 1 illustrates film based heating device 10 of the present disclosure. The film based heating device 10 has a base film 12 having a base film inner surface 12b and a base film outer surface 12a. The base film 12 contains base film electrically conductive filler 14. The film based heating device 10 also has at least a first laminate and a second laminate. The first laminate comprises a first laminate adhesive layer 16 having a first laminate adhesive layer inner surface 16a and a first laminate adhesive layer outer surface 16b. The first laminate adhesive layer 16 has first laminate adhesive layer electrically conductive filler 18. The first laminate also comprises a first laminate metal foil 20 having a first laminate metal foil inner surface 20a and a first laminate metal foil outer surface. The first laminate metal foil inner surface 20a is directly adhered to the first laminate adhesive layer outer surface 16b. The second laminate comprises a second laminate adhesive layer 22 having a second laminate adhesive layer inner surface 22a and a second laminate adhesive layer outer surface 22b. The second laminate adhesive layer 22 has second laminate adhesive layer electrically conductive filler 24. The second laminate also comprises a second laminate metal foil 26 having a second laminate metal foil inner surface 26a and a second laminate metal foil outer surface. The second laminate metal foil inner surface 26a directly adhered to the second laminate adhesive layer adhesive outer surface 22b. The first laminate adhesive layer inner surface 16a is directly adhered to a portion of the base film inner surface 12b. The second laminate adhesive layer inner surface 22a is directly adhered to a different portion of the base film inner surface 12b than the first laminate adhesive layer inner surface 16a.

Figure 2:
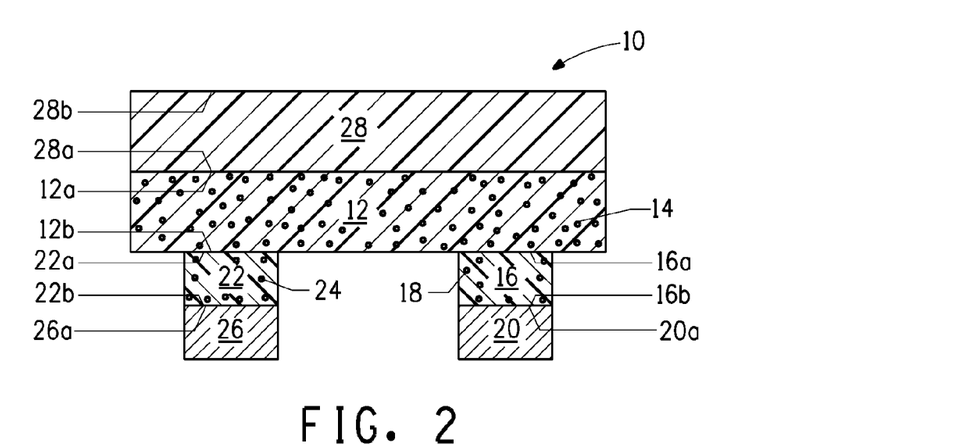
FIG. 2 is a cross-sectional drawing of another embodiment of a film based heating device having a base film, a first laminate, a second laminate and a secondary base film.

FIG. 2 illustrates one embodiment of the present disclosure. The film based heating device 10 optionally comprises a secondary base film 28. The secondary base film 28 has a secondary base film inner surface 28a and a secondary base film outer surface 28b. The secondary base film inner surface 28a is directly adhered to the base film outer surface 12a.

Figure 3:
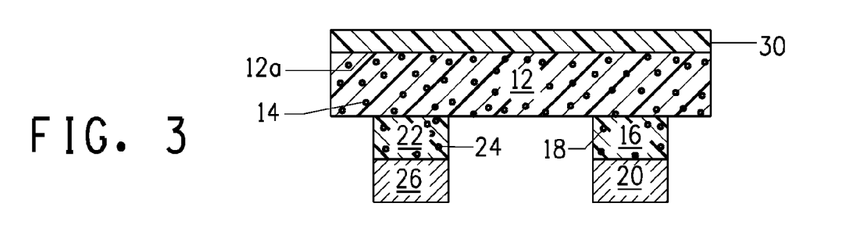
FIGS. 3 through 5 are cross-sectional drawings of different embodiments of a film based heating device having a base film, a first laminate, a second laminate and a cover layer.

FIG. 3 illustrates one embodiment of the present disclosure. The film based heating device may optionally comprise a cover layer 30. The cover layer 30 is attached to the base film outer surface 12a.

Figure 4:
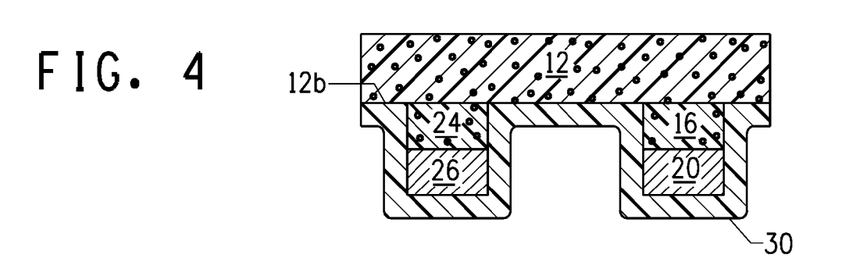

FIG. 4 illustrates another embodiment of the present disclosure. The film based heating device may optionally comprise a cover layer 30. The cover layer 30 is attached to the exposed areas of the base film inner surface 12b and the exposed areas of the first laminate adhesive layer 16, the first laminate metal foil 20, the second laminate adhesive layer 22 and the second laminate metal foil 26.

Figure 5:
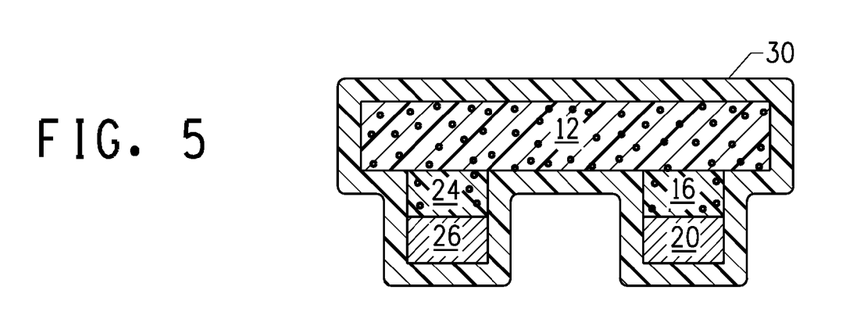

FIG. 5 illustrates another embodiment of the present disclosure. The film based heating device optionally comprises a cover layer 30 that encapsulates the base film 12, the first laminate adhesive layer 16, the first laminate metal foil 20, the second laminate adhesive layer 22 and the second laminate metal foil 26.

Base Film

The base film comprises a base film aromatic polyimide in an amount between and optionally including any two of the following numbers: 55, 60, 65, 70, 75, 80, 85, and 90 wt % based upon the total weight of the base film. In some embodiments, the base film aromatic polyimide is present in an amount from 55 to 90 weight percent based upon the total weight of the base film. In some embodiments, the base film aromatic polyimide is present in an amount from 60 to 85 weight percent based upon the total weight of the base film. In some embodiments, the base film aromatic polyimide is present in an amount from 65 to 80 weight percent based upon the total weight of the base film. In one embodiment, the base film aromatic polyimide of the present disclosure is derived from at least one aromatic dianhydride and at least one aromatic diamine.

In some embodiments, the aromatic diamine is selected from a group consisting of 4,4'-diaminodiphenyl propane, 4,4'-diaminodiphenyl methane, benzidine, 2,2'bis(trifluoromethyl)benzidine, 2,2'-bis(4-aminophenyl)hexafluoropropane, 3,5-diaminobenzotrifluoride; diaminodurene, 3,3',5,5'-tetramethyl benzidine, 4,4'-diaminodiphenyl sulfide, 3,3'-diaminodiphenyl sulfone, 4,4'-diaminodiphenyl sulfone, 1,5-diamino-naphthalene; 1,4-diamino-naphthalene, 4,4'-diaminodiphenylsilane, 4,4'-diaminodiphenyl(phenyl phosphine oxide), 4,4'-diaminodiphenyl-N-phenyl amine, 3,4'-diamino phenylether; 1,4-bis(4-aminophenoxy)benzene, 1,3-bis(4-aminophenoxy)benzene; 4,4'-diaminobenzanilide, 4,4'-bis(4-aminophenoxy)biphenyl, 9,9'-bis(4-aminophenyl)fluorine, m-tolidine, o-tolidine, 3,3' dihydroxy-4,4'-diaminobiphenyl, 1,4-diaminobenzene (p-phenylene-diamine), 1,3-diaminobenzene (p-phenylene-diamine), 1,2-diaminobenzene and mixtures thereof.

In some embodiments, the aromatic dianhydride is selected from a group consisting of 2,3,6,7-naphthalene tetracarboxylic dianhydride, 3,3',4,4'-biphenyl tetracarboxylic dianhydride, 1,2,5,6-naphthalene tetracarboxylic dianhydride, 2,2'3,3'-biphenyl tetracarboxylic dianhydride, 2,3',3,4'-biphenyl tetracarboxylic dianhydride, 3,3'4,4'-benzophenone tetracarboxylic dianhydride, 2,2-bis-(3,4-dicarboxyphenyl)propane dianhydride, bis(3,4-dicarboxyphenyl)sulfone dianhydride, 3,4,9,10-perylene tetracarboxylic dianhydride, 1,1-bis(3,4-dicarboxyphenyl)ethane dianhydride, bis-(3,4-dicarboxyphenyl)methane dianhydride, 4,4'-oxydiphthalic dianhydride, bis(3,4dicarboxyphenyl)sulfone dianhydride, 2,2-bis(3,4-dicarboxyphenyl), hexafluoropropane dianhydride; bis(3,4-dicarboxyphenyl) sulfide; hydroquinone, diphthalic anhydride and mixtures thereof. In some embodiments, at least 70 mole percent of the base film aromatic polyimide is derived from pyromellitic dianhydride and 4,4'-diaminodiphenyl ether. In some embodiments, the base film aromatic polyimide is derived from pyromellitic dianhydride and 4,4'-diaminodiphenyl ether.

The base film comprises a base film electrically conductive filler in an amount between and optionally including any two of the following numbers: 10, 15, 20, 25, 30, 35, 40, and 45 weight percent based upon the total weight of the base film. In some embodiments, the base film electrically conductive filler is present in an amount from 10 to 45 weight percent based upon the total weight of the base film. In some embodiments, the base electrically conductive filler is present in an amount from 15 to 40 weight percent based upon the total weight of the base film. In some embodiments, the base electrically conductive filler is present in an amount from 20 to 35 weight percent based upon the total weight of the base film. In some embodiments, the base film electrically conductive filler is carbon black. In some embodiments, the base film electrically conductive filler is selected from the group consisting of: acetylene blacks, super abrasion furnace blacks, conductive furnace blacks, conducting channel type blacks and fine thermal blacks and mixtures thereof. Surface oxidation of carbon black, which is typically measured by volatile content, refers to various oxygenated species (such as carboxyl, hydroxyl, quinone) present on the surface of the aggregates. While these species are present to some extent in all carbon blacks, some blacks are post-treated to intentionally increase the amount of surface oxidation. The oxygen complexes on the surface act as an electrically insulating layer. Thus, low volatility content is generally desired for high conductivity. However, it is also necessary to consider the difficulty of dispersing the carbon black. Even dispersion of the electrically conductive filler facilitates even heating of the film based heating device. Surface oxidation enhances deagglomeration and dispersion of carbon black. In some embodiments, when the base film electrically conductive filler is carbon black, another embodiment, the carbon black has a volatile content less than or equal to 1%. In one embodiment, the carbon black is RAVEN® 16 (available from Columbian Chemicals Company), in another embodiment, the carbon black is CDX 7055U (available from Columbian Chemicals Company). In some embodiments, the base film electrically conductive filler has an electrical resistance of at least 100 Ohms/square. In some embodiments, the base film electrically conductive filler has an electrical resistance of at least 1000 Ohms/square. In another embodiment, the base film electrically conductive filler has an electrical resistance of at least 10,000 Ohms/square. In some embodiments, the base film electrically conductive filler is metal or metal alloy. In some embodiments, the base film electrically conductive filler is a mixture of electrically conductive fillers. In some embodiments, the base film electrically conductive filler is milled to obtain desired agglomerate size (particle size). In some embodiments, the average particle size of the base film electrically conductive filler is between and optionally including any two of the following numbers: 0.05, 0.1, 0.2, 0.3, 0.4, 0.5, 0.6, 0.7, 0.8, 0.9 and 1 micron. The average particle size can be determined using a Horiba Scattering Light Particle Analyzer. In some embodiments, the average particle size of the base film electrically conductive filler is from 0.05 to 1 micron. In some embodiments, the average particle size of the base film electrically conductive filler is from 0.1 to 0.5 microns. Generally, an average particle size above 1 micron is more likely to cause electrical shorts and/or hot spots. In another embodiment, the base film electrically conductive filler particle size is less than or equal to 1 micron. Ordinary skill and experimentation may be necessary in fine tuning the type and amount of electrically conductive filler sufficient to achieve desired resistance depending upon the particular application. In some embodiments, desired base film resistance is from 10 Ohms square to 1,000,000 Ohms square measured using a four point probe from Veeco Instruments Inc, model FPP5000.

In some embodiments, the base film thickness is between and optionally including any two of the following numbers: 8, 10, 20, 40, 60, 80, 100, 120, 140, 160, 180 and 200 microns. In some embodiments, the base film thickness is from 8 to 200 microns. In some embodiments, the base film thickness is from 8 to 100 microns. In some embodiments, the base film thickness is from 8 to 50 microns. In some embodiments, the base film thickness is from 8 to 25 microns.

In some embodiments, the base film optionally comprises a non-electrically conductive filler. In some embodiments, the non-electrically conductive filler is present in and amount between and optionally including any two of the following numbers: 1, 2, 4, 6, 8, 10, 12, 14 and 15 weight percent based upon the total weight of the base film. In some embodiments, the base film comprises from 1 to 15 weight percent of non-electrically conductive filler. In some embodiments, the non-electrically conductive filler is selected from the group consisting of metal oxides, carbides, borides and nitrides. In some embodiments, the non-electrically conductive filler is selected from, but not limited to, the group consisting of aluminum oxide, titanium dioxide, silica, mica, talc, barium titanate, barium sulfate, dicalcium phosphate, and mixtures thereof.

Preparation of Base Film

The base film can be prepared by any method well known in the art. In some embodiments, a base film electrically conductive filler slurry is prepared. In one embodiment, the base film electrically conductive filler can be added to a solution of polyamic acid in solvent (for example, DMAC) or a solution of base film electrically conductive filler in solvent can be mixed with a solution of polyamic acid in solvent. The slurry is mixed. In some embodiments, the slurry is mixed in a rotor stator, high-speed dispersion mill. In some embodiments, the slurry is milled until the desired base film electrically conductive filler particle size is achieved. In some embodiments a ball mill is used. In some embodiments, the milled slurry is filtered to remove any residual large particles. The slurry may be stored in a tank equipped with a mixer in order to maintain the state of dispersion until the slurry is ready to be used or the slurry may be used directly after milling.

A polyamic acid solution is prepared. The polyamic acid solution can be made by methods well known in the art. The polyamic acid solutions can generally be made by dissolving the aromatic diamine in a dry, (water deficient) solvent and slowly adding the dianhydride under conditions of agitation and controlled temperature in an inert atmosphere. The organic solvent should dissolve one or both of the polymerizing reactants. The organic solvent will dissolve the formed polyamic acid. The solvent should be substantially unreactive with all of the polymerizing reactants and with the polyamic acid polymerization product. For the purpose of this disclosure suitable solvents include the lower molecular weight members of such carboxylamides, particularly N,N-dimethylformamide and N,N-dimethylacetamide. Other useful solvents are N,N-diethylformamide, N,N-diethylacetamide, N-methyl-2-pyrrolidone, tetramethyl urea, dimethylsulfone, and the like. The solvents can be used alone or in combinations with one another. The polyamic acid solution may or may not be filtered.

In some embodiments, the polyamic acid solution is mixed in a high shear mixer with the base film electrically conductive filler slurry and optionally a non-electrically conductive filler slurry. In some embodiments, the dispersions may also include one or more suitable dispersing agents known to a skilled artisan for assistance in forming a stable dispersion. However the dispersions are prepared, the dispersion of the base film electrically conductive filler is conducted in such a manner as to avoid undue agglomeration. In some embodiments, the solution can be cast, or applied onto, a support such as an endless metal surface (belt) or rotating drum. In some embodiments, a small amount of a release agent may be added to enable the cast film to be readily stripped from the casting surface. In some embodiments, the base film aromatic polyimide is chemically converted. In some embodiments, the base film aromatic polyimide is thermally converted. In some embodiments, the amount of polyamic acid, base film electrically conductive filler slurry are adjusted to achieve the desired loading levels of base film electrically conductive filler and casting solution desired viscosity.

First Laminate

The first laminate comprises a first laminate adhesive layer and a first laminate metal foil. The first laminate adhesive layer contains a first laminate adhesive layer thermoplastic polyimide and a first laminate adhesive layer electrically conductive filler. The first laminate adhesive layer thermoplastic polyimide is derived from at least one aromatic diamine and at least one aromatic dianhydride. Thermoplastic polyimides are generally polyimides with glass transition temperatures less than 280 degrees centigrade or more preferably less than 250 degrees centigrade. They have adequate flow under appropriate heat and pressure to form a reliable adhesive bond (greater than or equal to 2 pli) between the first laminate metal foil and the base film. The use of aromatic diamines and aromatic dianhydrides moieties enables high temperature stability. In some embodiments, small amounts of aliphatic diamines or cycloaliphatic diamines may be used so long as the amount does not detrimentally affect the high temperature stability of the adhesive layers. Typically thermoplastic polyimides of the present disclosure are prepared from using, at least in part, flexible aromatic diamines and/or dianhydrides. In some embodiments, the first laminate adhesive layer thermoplastic polyimide aromatic dianhydride is selected from, but not limited to, the group consisting of: 4,4-oxydiphthalic anhydride, 2,3',3,4'-biphenyl tetracarboxylic dianhydride, 3,3',4,4'-benzophenone tetracarboxylic dianhydride, hydroquinone diphthalic anhydride, bis-(3,4-dicarboxyphenyl) bisphenyl A dianhydride 3,3',4,4'-diphenylsulfone tetracarboxylic dianhydride and mixtures thereof. In some embodiments, the thermoplastic polyimide aromatic diamine is selected from, but not limited to, the group consisting of: 1,3-bis(3-aminophenoxy)benzene, 1,3-bis(4-aminophenoxy)benzene, 1,4-bis(4-aminophenoxy)benzene, 2,2-bis(4-[4-aminophenoxy]phenyl)propane, 2,2-bis(4-[4-aminophenoxy]phenyl)hexafluoropropane, bis-4-[3-aminophenoxy] phenylsulphone, bis-4-[4-aminophenoxy]phenylsulphone, 4,4'-bis(4-aminophenoxy)biphenyl, 3,4'-diaminophenyl ether and mixtures thereof. In some embodiments, the first laminate adhesive layer thermoplastic polyimide is derived at least in part from 4,4'-oxydiphthalic anhydride (ODPA), pyromellitic dianhydride (PMDA) and 1,3-bis(4-aminophenoxy)benzene (RODA). The first laminate adhesive layer thermoplastic polyimide is present in an amount between and optionally including any two of the following numbers: 55, 65, 70, 75, 80, 85, and 90 weight percent based upon the total weight of the first laminate adhesive layer. In some embodiments, the first laminate adhesive layer thermoplastic polyimide is present in an amount from 55 to 90 weight percent based upon the total weight of the first laminate adhesive layer. In some embodiments, the first laminate adhesive layer thermoplastic polyimide is derived from 70 to 95 mole percent of oxydiphthalic dianhydride, 5 to 30 mole percent of pyromellitic dianhydride and at least 70 mole percent of 1,3-bis(4-aminophenoxy)benzene. In some embodiments, at least 80 mole percent of 1,3-bis(4-aminophenoxy)benzene is present.

In some embodiments, 70 to 100 mole percent of the first laminate adhesive layer thermoplastic polyimide is derived from at least one aromatic diamine and at least one aromatic dianhydride. In some embodiments, between and optionally including any two of the following numbers: 70, 72, 74, 76, 78, 80, 82, 84, 86, 88, 90, 92, 94, 96, 98, 99 and 100 mole percent of the first laminate adhesive layer thermoplastic polyimide is derived from at least one aromatic diamine and at least one aromatic dianhydride. In some embodiments, 80 to 100 mole percent of the first laminate adhesive layer thermoplastic polyimide is derived from at least one aromatic diamine and at least one aromatic dianhydride. In another embodiment, 90 to 100 mole percent of the first laminate adhesive layer thermoplastic polyimide is derived from at least one aromatic diamine and at least one aromatic dianhydride. In yet another embodiment, 70 to 99 mole percent of the first laminate adhesive layer thermoplastic polyimide is derived from at least one aromatic diamine and at least one aromatic dianhydride. In yet another embodiment, 80 to 99 mole percent of the first laminate adhesive layer thermoplastic polyimide is derived from at least one aromatic diamine and at least one aromatic dianhydride. In yet another embodiment, 80 to 99 mole percent of the first laminate adhesive layer thermoplastic polyimide is derived from at least one aromatic diamine and at least one aromatic dianhydride.

The first laminate adhesive layer electrically conductive filler is present in an amount between and optionally including any two of the following numbers: 10, 15, 20, 25, 30, 35, 40, and 45 weight percent based on the total weight of the first laminate adhesive layer. In some embodiments, the first laminate adhesive layer electrically conductive filler is present in an amount from 10 to 45 weight percent based upon the total weight of the first laminate adhesive layer. In some embodiments, the first laminate adhesive layer electrically conductive filler is present in an amount from 15 to 40 weight percent based upon the total weight of the first laminate adhesive layer. In some embodiments, the first laminate adhesive layer electrically conductive filler is present in an amount from 20 to 35 weight percent based upon the total weight of the first laminate adhesive layer.

In some embodiments, the first laminate adhesive layer thickness is between and optionally including any two of the following numbers: 5, 12, 15, 20, 25, 30, 35, 40, 45, 50, 55, 60, 65, 70, 75 and 80 microns. In some embodiments, the first laminate adhesive layer thickness is from 5 to 80 microns. The first laminate adhesive layer should be thick enough to adhere the first laminate metal foil to the base film but not so thick that voltage drop or undesired resistance from the first laminate metal foil to the base film occurs.

The first laminate metal foil thickness is between and optionally including any two of the following numbers 5, 10, 20, 40, 60, 80, 100, 120, 140, 160, 180 and 200 microns. In some embodiments, the first laminate metal foil thickness is from 5 to 200 microns. The first laminate metal foil may be composed of any suitable conductive material. In some embodiments, the first laminate metal foil is selected from, but not limited to, the group consisting of gold, silver, platinum, nickel, palladium, stainless steel, titanium, Inconel®, invar and aluminum. In some embodiments, the first laminate metal foil is copper.

Second Laminate

The second laminate comprises a second laminate adhesive layer and a second laminate metal foil. The second laminate adhesive layer contains a second laminate adhesive layer thermoplastic polyimide and a second laminate adhesive layer electrically conductive filler. The second laminate adhesive layer thermoplastic polyimide is derived from at least one aromatic diamine and one aromatic dianhydride. In some embodiments, small amounts of aliphatic diamine or cycloaliphatic diamine may be used so long as the amount does not detrimentally affect the high temperature stability of the adhesive layers. Typically thermoplastic polyimides of the present disclosure are prepared from using, at least in part, flexible aromatic diamines and/or dianhydrides. In some embodiments, the second laminate adhesive layer thermoplastic polyimide aromatic dianhydride is selected from, but not limited to, the group consisting of: 4,4-oxydiphthalic anhydride, 2,3',3,4'-biphenyl tetracarboxylic dianhydride, 3,3',4,4'-benzophenone tetracarboxylic dianhydride, hydroquinone diphthalic anhydride, bis-(3,4-dicarboxyphenyl) bisphenyl A dianhydride3.3',4,4'-diphenylsulfone tetracarboxylic dianhydride and mixtures thereof. In some embodiments, the second laminate adhesive layer thermoplastic polyimide aromatic diamine is selected from, but not limited to, the group consisting of: 1,3-bis(3-aminophenoxy) benzene, 1,3-bis(4-aminophenoxy)benzene, 1,4-bis(4-aminophenoxy)benzene, bis-4-[3-aminophenoxy]phenylsulphone, bis-4-[4-aminophenoxy]phenylsulphone, 3,4'-diaminophenyl ether and mixtures thereof. In some embodiments, the second laminate adhesive layer thermoplastic polyimide is derived at least in part from 4,4'-oxydiphthalic anhydride (ODPA), pyromellitic dianhydride (PMDA) and 1,3-bis(4-aminophenoxy)benzene (RODA). In another embodiment, the first laminate adhesive layer thermoplastic polyimide and the second laminate adhesive layer thermoplastic polyimide are derived in part from 4,4'-oxydiphthalic anhydride, pyromellitic dianhydride and 1,3-bis(4-aminophenoxy)benzene. The second laminate adhesive layer thermoplastic polyimide is present in an amount between and optionally including any two of the following numbers: 55, 60, 65, 70, 75, 80, 85, and 90 weight percent based upon the total weight of the second laminate adhesive layer. In some embodiments, the second laminate adhesive layer thermoplastic polyimide is present in an amount from 55 to 90 weight percent based upon the total weight of the second laminate adhesive layer In some embodiments, the second laminate adhesive layer thermoplastic polyimide is derived from 70 to 95 mole percent of oxydiphthalic dianhydride, 5 to 30 mole percent of pyromellitic dianhydride and at least 70 mole percent of 1,3-bis(4-aminophenoxy)benzene. In some embodiments, at least 80 mole percent of 1,3-bis(4-aminophenoxy)benzene is present.

In some embodiments, 70 to 100 mole percent of the second laminate adhesive layer thermoplastic polyimide is derived from at least one aromatic diamine and at least one aromatic dianhydride. In some embodiments, between and optionally including any two of the following numbers: 70, 72, 74, 76, 78, 80, 82, 84, 86, 88, 90, 92, 94, 96, 98, 99 and 100 mole percent of the second laminate adhesive layer thermoplastic polyimide is derived from at least one aromatic diamine and at least one aromatic dianhydride. In some embodiments, 80 to 100 mole percent of the second laminate adhesive layer thermoplastic polyimide is derived from at least one aromatic diamine and at least one aromatic dianhydride. In another embodiment, 90 to 100 mole percent of the second laminate adhesive layer thermoplastic polyimide is derived from at least one aromatic diamine and at least one aromatic dianhydride. In yet another embodiment, 70 to 99 mole percent of the second laminate adhesive layer thermoplastic polyimide is derived from at least one aromatic diamine and at least one aromatic dianhydride. In yet another embodiment, 80 to 99 mole percent of the second laminate adhesive layer thermoplastic polyimide is derived from at least one aromatic diamine and at least one aromatic dianhydride. In yet another embodiment, 90 to 99 mole percent of the second laminate adhesive layer thermoplastic polyimide is derived from at least one aromatic diamine and at least one aromatic dianhydride.

The second laminate adhesive layer electrically conductive filler is present in an amount between and optionally including any two of the following numbers: 10, 15, 20, 25, 30, 35, 40, and 45 weight percent based on the total weight of the second laminate adhesive layer. In some embodiments, the second laminate adhesive layer electrically conductive filler is present in an amount from 10 to 45 weight percent based upon the total weight of the second laminate adhesive layer. In some embodiments, the second laminate adhesive layer electrically conductive filler is present in an amount from 15 to 40 weight percent based upon the total weight of the second laminate adhesive layer. In some embodiments, the second laminate adhesive layer electrically conductive filler is present in an amount from 20 to 35 weight percent based upon the total weight of the second laminate adhesive layer. In some embodiments, the first laminate adhesive layer electrically conductive filler and the second laminate adhesive layer electrically conductive filler are the different. In some embodiments, first laminate adhesive layer electrically conductive filler and the second laminate adhesive layer electrically conductive filler are the same. In another embodiment, the base film electrically conductive filler, the first laminate adhesive layer electrically conductive filler and the second laminate adhesive layer electrically conductive filler are the same. In yet another embodiment, base film electrically conductive filler, the first laminate adhesive layer electrically conductive filler and the second laminate adhesive layer electrically conductive filler are independently the same or different.

In some embodiments, base film electrically conductive filler, the first laminate adhesive layer electrically conductive filler and the second laminate adhesive layer electrically conductive filler each comprise carbon black. In some embodiments, the first laminate adhesive layer electrically conductive filler and the second laminate adhesive layer electrically conductive filler are independently selected from the group consisting of: acetylene blacks, super abrasion furnace blacks, conductive furnace blacks, conducting channel type blacks and fine thermal blacks and mixtures thereof. In some embodiments, when the first laminate adhesive layer electrically conductive filler or the second laminate adhesive layer electrically conductive filler or both are carbon black, the carbon black has a volatile content less than or equal to 2%. In another embodiment, the carbon black has a volatile content less than or equal to 1%. In one embodiment, the carbon black is RAVEN® 16 (available from Columbian Chemicals Company), in another embodiment, the carbon black is CDX 7055U (available from Columbian Chemicals Company). In some embodiments, the base film electrically conductive filler, the first laminate adhesive layer electrically conductive filler and the second laminate adhesive layer electrically conductive filler are carbon black. In some embodiments, the first laminate adhesive layer electrically conductive filler and the second laminate adhesive layer electrically conductive filler have an electrical resistance of at least 100 Ohms/square. In some embodiments, the first laminate adhesive layer electrically conductive filler, the second laminate adhesive layer electrically conductive filler or both have an electrical resistance of at least 1000 Ohms/square. In another embodiment, the first laminate adhesive layer electrically conductive filler or the second laminate adhesive layer electrically conductive filler or both have an electrical resistance of at least 10,000 Ohms/square. The first laminate adhesive layer electrically conductive filler may be a mixture of electrically conductive fillers. The second laminate adhesive layer electrically conductive filler may be a mixture of electrically conductive fillers.

The first laminate adhesive layer electrically conductive filler and second laminate adhesive layer electrically conductive filler aids in carrying current to the base film. If electrically conductive filler is not used in the first laminate adhesive layer or the second laminate adhesive layer then the adhesive layers are not conductive and will act as a dielectric barrier. If first laminate adhesive layer electrically conductive filler and the second laminate adhesive layer electrically conductive filler have low electrical conductivity more current is necessary to meet the desire resistance in the base film. The first laminate adhesive layer and the second laminate adhesive layer should have the same or higher conductivity than the base film. If the conductivity of the first laminate adhesive layer and the second laminate adhesive layer is lower than the base film, undesirable heating of the first laminate metal foil or second laminate metal foil or both may occur. Ordinary skill and experimentation may be necessary in fine tuning the type and amount of electrically conductive filler sufficient to achieve desired resistance in the base film while balancing adhesion strength and physical properties.

In some embodiments, the first laminate adhesive layer electrically conductive filler or the second laminate adhesive layer electrically conductive filler or both are milled to obtain desired particle size. In some embodiments, the average particle size of the first laminate adhesive layer electrically conductive filler or the second laminate adhesive layer electrically conductive filler is between and optionally including any two of the following numbers: 0.05, 0.1, 0.2, 0.3, 0.4, 0.5, 0.6, 0.7, 0.8, 0.9 and 1 micron. The average particle size can be determined using a Horiba Scattering Light Particle Analyzer. In some embodiments, the average particle size of the first laminate adhesive layer electrically conductive filler or the second laminate adhesive layer electrically conductive filler is from 0.05 to 1 micron. In some embodiments, the average particle size of the first laminate adhesive layer electrically conductive filler or the second laminate adhesive layer electrically conductive filler is from 0.1 to 0.5 microns. In another embodiment, the first laminate adhesive layer electrically conductive filler or the second laminate adhesive layer electrically conductive filler is less than or equal to 1 micron.

In some embodiments, the second laminate adhesive layer thickness is between and optionally including any two of the following numbers: 5, 12, 15, 20, 25, 30, 35, 40, 45, 50, 55, 60, 65, 70, 75 and 80 microns. In some embodiments, the second laminate adhesive layer thickness is from 5 to 80 microns. The second laminate adhesive layer should be thick enough to adhere the second laminate metal foil to the base film but not so thick that voltage drop or undesired resistance from the second laminate metal foil to the base film occurs.

Acrylic and epoxy adhesives not able to withstand the high lamination temperatures (290 degrees centigrade or greater to bond the metal foil to the base film. Acrylic and epoxy adhesives will not withstand high temperatures (200 degrees centigrade or above) for long term use. First laminate adhesive layer thermoplastic polyimide and the second laminate adhesive layer thermoplastic polyimide of the present disclosure can withstand the high lamination temperatures of greater than 290 degrees centigrade and are capable of high temperature long term use.

The second laminate metal foil thickness between and optionally including any two of the following numbers: 5, 10, 20, 40, 60, 80, 100, 120, 140, 160, 180 and 200 microns. In some embodiments, the second laminate metal foil thickness is from 5 to 200 microns. Typically for lower voltage applications (less than 48 volts) a thinner metal foil for the first laminate metal foil and the second laminate metal foil can be used with out failure. High voltage applications typically require thicker metal foils. The metal foil thickness can be tailored to the application or the voltage requirements. The first laminate adhesive layer and the second laminate adhesive layer of the present disclosure provide good adherence of the first laminate metal foil and second laminate metal foil to the base film. Adhesion must be sufficient to prevent air pockets and voids which can cause electrical arcing and potentially device (heater) failure. Additionally, good adherence should be maintained over long term use. The second laminate metal foil may be composed of any suitable conductive material. In some embodiments, the second laminate metal foil is selected from, but not limited to, the group consisting of gold, silver, platinum, nickel, palladium, stainless steel, titanium, Inconel®, invar and aluminum. In some embodiments, the second laminate metal foil is copper.

In some embodiments, the first laminate metal foil and the second laminate metal foil are different. In some embodiments, the first laminate metal foil and the second laminate metal foil are the same. In one embodiment, first laminate metal foil and the second laminate metal foil comprise copper. In one embodiment, first laminate metal foil and the second laminate metal foil are copper. Copper has little to no voltage drop over long lengths. This is particularly advantageous when even heating over long lengths is desirable.

In some embodiments, the first laminate adhesive layer, the second laminate adhesive layer or both first laminate adhesive layer and the second laminate adhesive layer optionally comprise from 1 to 15 weight percent of non-electrically conductive filler. In some embodiments, the non-electrically conductive filler is selected from the group consisting of metal oxides, carbides, borides and nitrides. In some embodiments, the non-electrically conductive filler is selected from, but not limited to, the group consisting of aluminum oxide, titanium dioxide, silica, mica, talc, barium titanate, barium sulfate, dicalcium phosphate, and mixtures thereof.

In one embodiment, the first laminate adhesive layer or the second laminate adhesive layer may additionally comprise aliphatic diamine, a cycloaliphatic diamine and any combination thereof. As the mole percent of aliphatic diamine (or cycloaliphatic diamine) to aromatic diamine increases, the glass transition temperature (Tg) of the polyimide, and lamination temperature will generally tend to decrease. In some embodiments, the first laminate adhesive layer thermoplastic polyimide is also derived from 1 to 30 mole percent of a non-aromatic diamine selected from the group consisting of aliphatic diamine, cycloaliphatic diamine and a combination thereof. In some embodiments, the second laminate adhesive layer thermoplastic polyimide is also derived from 1 to 30 mole percent of a non-aromatic diamine selected from the group consisting of aliphatic diamine, cycloaliphatic diamine and a combination thereof. In another embodiment, the first laminate adhesive layer thermoplastic polyimide and the second laminate adhesive layer thermoplastic polyimide are also derived from 1 to 30 mole percent of a non-aromatic diamine selected from the group consisting of aliphatic diamine, cycloaliphatic diamine or a combination thereof. In some embodiments, the first laminate adhesive layer thermoplastic polyimide and the second laminate adhesive layer thermoplastic polyimide or both are also derived from between and optionally including any two of the following numbers: 1, 2, 4, 6, 10, 12, 14, 16, 18, 20, 22, 24, 26, 28 and 30 mole percent of a non-aromatic diamine selected from the group consisting of aliphatic diamine, cycloaliphatic diamine or a combination thereof. Above 30 mole percent of aliphatic diamine, cycloaliphatic diamine or a combination thereof, the high temperature stability of the adhesive layers decreases. In some embodiments, the first laminate adhesive layer thermoplastic polyimide and the second laminate adhesive layer thermoplastic polyimide or both are also derived from 1 to 20 mole percent of a non-aromatic diamine selected from the group consisting of aliphatic diamine, cycloaliphatic diamine or a combination thereof. In another embodiment, the first laminate adhesive layer thermoplastic polyimide and the second laminate adhesive layer thermoplastic polyimide or both are also derived from 1 to 10 mole percent of a non-aromatic diamine selected from the group consisting of aliphatic diamine, cycloaliphatic diamine or a combination thereof. In one embodiment, for bonding to metal to properly occur, the lamination temperature is typically about 25° C. higher than the glass transition temperature of the polyimide adhesive. In some embodiments, suitable aliphatic diamines is selected from the group consisting of 1,4-tetramethylenediamine, 1,5-pentamethylenediamine (PMD), 1,7-heptamethylenediamine, 1,8-octamethylenediamine, 1,9-nonamethylenediamine, 1,10-decamethylenediamine (DMD), 1,11-undecamethylenediamine, 1,12-dodecamethylenediamine (DDD), 1,16-hexadecamethylenediamine and mixtures thereof. In some embodiments, the aliphatic diamine is hexamethylene diamine. In some embodiments, the first laminate adhesive layer thermoplastic polyimide and the second laminate adhesive layer thermoplastic polyimide are each derived from 4,4'-oxydiphthalic anhydride, pyromellitic dianhydride, 1,3-bis(4-aminophenoxy)benzene and hexamethylene diamine.

Preparation of First and Second Laminate

The first laminate adhesive layer and second laminate adhesive layer can be prepared by any method well known in the art. In one embodiment, polyamic acid is prepared by reacting anhydrides and amines in DMAC solvent with a small excess of diamine. Electrically conductive filler slurry in DMAC is prepared by mixing the desired amount electrically conductive filler into DMAC solvent with a Silverson L4RT-A high shear mixer at 4000-6000 rpm for 5-10 minutes or until the electrically conductive filler is dispersed. The electrically conductive filler slurry is then added to the polyamic acid solution and mixed again with Silverson L4RT-A high shear mixer at approximately 4000-6000 rpm until desired amount of electrically conductive filler, for example 30% by weight, is achieved in the polyamic acid. A finishing solution of dianhydride monomer in DMAC, to increase the molecular weight, is added in incremental steps until a target viscosity 500-1000 Poise is reached. The slurry is degassed to remove any air bubbles before film casting. In some embodiments, the filled finished polymer solution is cast directly on to bare copper sheets of approximately 14 inches long×10 inches wide×0.001 inches thick. Sample is then placed onto a hot plate at approximately 80 C to 100 C for solvent drying for about 30 minutes or until at least 70% or higher film solids is achieved (green film state). The filled polyimide green film on copper is then placed onto a film curing support frame. The filled polyimide adhesive film on copper is then placed into a Blue M nitrogen purged high temperature oven for curing with ramping conditions of 50° C. per 10 minutes from 100 C to 400 C for 60 minutes and then slowly cooled back to room temperature for another 60 minutes under nitrogen environment. In some embodiments, the first laminate adhesive layer thermoplastic polyimide or second laminate adhesive layer thermoplastic polyimide or both are thermally converted from a polyamic acid to a polyimide. In some embodiments, the first laminate adhesive layer thermoplastic polyimide or second laminate adhesive layer thermoplastic polyimide or both adhesive layer polyimides are converted using appropriate imidization agents in addition to heat. In some embodiments, the first laminate and second laminate can be prepared by methods well known in the art such as double belt press or nip lamination.

Heating Device

The film based heating device of the present disclosure is directed to high temperature applications for long term use. The film based heating device of the present disclosure also provides even heating. One known method used to promote even heating is the use of nodes to facilitate the control or to migrate localized heating. The film based heating device of the present disclosure does not require any additional means, such as nodes positioned through out the film heating device, to achieve even heating. Additionally, the first laminate adhesive layer and the second laminate adhesive layer of the present disclosure are able to withstand the high lamination temperatures required to adhere the first laminate metal foil and the second laminate metal foil to the base film. Typically lamination temperatures of greater than 290 degrees centigrade are required.

The film based heating device temperature is dependant on the voltage and metal foil (bus bar) placement or spacing. For a fixed bus bar location, when the voltage is increase, the temperature is increased. For constant voltage, the temperature can be increase by decreasing the distance between the metal foils. In some embodiments, more than two metal foils are used. The number of metal foils used will depend on the size of the heated area and the desired temperature. Thus the heating device can be tailored to the desired end use. The film based heating device of the present disclosure may be used for flexible or rigid applications. Some examples of high temperature end use applications are clothing irons, hair straightening irons and industrial heater applications. The film based heating device of the present disclosure is useful as wall heaters, floor heaters, roof heaters and seat heaters. The film based heating device of the present disclosure is useful for heating of windmill blades, leading edge of aircraft wings and helicopter blades for the prevention of snow or ice accumulation or any application where little or no voltage drop over long lengths is desired. While the above applications are particularly well suited for the film based heating device of the present disclosure, one of skill in the art could envision using the film based heating device for additional heating applications, such as low voltage low temperature, low voltage high temperature, high voltage low temperature application in addition to high voltage high temperature applications.

The base film has a base film inner surface and a base film outer surface. The first laminate adhesive layer has a first laminate adhesive layer inner surface and a first laminate adhesive layer outer surface. The first laminate metal foil has a first laminate metal foil inner surface and a first laminate metal foil outer surface. The first laminate metal foil inner surface is directly adhered to the first laminate adhesive layer outer surface. The first laminate adhesive layer inner surface is directly adhered to a portion of the base film inner surface.

The second laminate adhesive layer has a second laminate adhesive layer inner surface and a second laminate adhesive layer outer surface. The second laminate metal foil has a second laminate metal foil inner surface and a second laminate metal foil outer surface. The second laminate metal foil inner surface is directly bonded to the second laminate adhesive layer outer surface. The second laminate adhesive layer inner surface is directly adhered to a different portion of the base film inner surface than the first laminate adhesive layer inner surface. In one embodiment, electric current flows between the first laminate and the second laminate, via the base film that bridges the two laminates, thereby creating resistive heating of the base film.

In some embodiments, the film based heating device of the present invention may additionally comprising a secondary base film having a secondary base film outer surface and a secondary base film inner surface, the secondary base film inner surface being directly adhered to the base film outer surface. In one embodiment, the secondary base film comprises a secondary base film aromatic polyimide. The secondary base film provides a dielectric barrier. Use of a secondary base film allows the heating device to be attached to adjacent electrically conductive surfaces without interference with the conductive film heated surface. Therefore it is undesirable for the secondary base film to contain electrically conductive fillers. The secondary base film aromatic polyimide can be the same or different as base film aromatic polyimide in the base film. In some embodiments, the secondary base film aromatic polyimide is derived from pyromellitic dianhydride and 4,4'-diaminodiphenyl ether.

The film based heating device can be prepared by vacuum press lamination. Sufficient heat and pressure is required to adhere the first laminate and second laminate (or more) to the base film.

In one embodiment, the film based heating device additionally comprises a cover layer. In one embodiment, the cover layer is directly attached to the base film outer surface. In another embodiment, the cover layer is directly attached to the secondary base film outer surface. In some embodiments, there may be additional layers between the cover layer and base film. In another embodiment, cover layer is attached to the exposed areas of the base film inner surface (areas that are not directly adhered to the first laminate adhesive layer or the second laminate adhesive layer and the exposed areas of the first laminate and the second laminate. In another embodiment, cover layer encapsulates the film based heating device as illustrated in FIG. 5. In another embodiment, the cover layer can be attached to both the base film outer surface (or the secondary base film outer surface 28*b*) and the exposed areas of the first laminate and the second laminate and the inner surface of the base film that is not directly adhered to the first laminate adhesive layer or the second laminate adhesive layer. In some embodiments, the cover layer encapsulates at least the base film, the first laminate and the second laminate. In some embodiments, the cover layer encapsulates at least the base film, the first laminate adhesive layer, the first laminate metal foil, the second laminate adhesive layer and the second laminate metal foil.

In some embodiments, the cover layer is selected from the group consisting of tetrafluoroethylene hexafluoropropylene copolymer (FEP), perfluoroalkoxy polymer (PFA) and mixtures thereof. PFA is a poly(tetrafluoroethylene-co-perfluoro [alkyl vinyl ether]), including variations or derivatives thereof, having the following moiety representing at least 50, 60, 70, 80, 85, 90, 95, 96, 97, 98, 99 or about 100 weight percent of the entire polymer:

where R1 is CnF2n+1, where n can be any natural number equal to or greater than 1 including up to 20 or more, typically n is equal to 1 to three, where x and y are mole fractions, where x is in a range from 0.95 to 0.99, typically 0.97, and where y is in a range from 0.01 to 0.05, typically 0.03, and where the melt flow rate, described in ASTM D 1238, is in a range of from 1 to 100 (g/10 min.), preferably 1 to 50 (g/10 min.), more preferably, 2 to 30 (g/10 min.), and most preferably 5 to 25 (g/10 min.).

FEP is a poly(tetrafluoroethylene-co-hexafluoropropylene) [a.k.a. poly(tetrafluoroethylene-co-hexafluoropropylene)copolymer], derived in whole or in part from tetrafluoroethylene and hexafluoropropylene, including variations or derivatives thereof, having the following moiety representing at least 50, 60, 70, 80, 85, 90, 95, 96, 97, 98, 99 or about 100 weight percent of the entire polymer:

where x and y are mole fractions, where x is in a range from 0.85 to 0.95, typically 0.92, and where y is in a range from 0.05 to 0.15, typically 0.08, and where the melt flow rate, described in ASTM D 1238, is in a range of from 1 to 100 (g/10 min.), preferably 1 to 50 (g/10 min.), more preferably, 2 to 30 (g/10 min.), and most preferably 5 to 25 (g/10 min.).

The FEP copolymer can be derived directly or indirectly from: (i.) 50, 55, 60, 65, 70 or 75 percent to about 75, 80, 85, 90 or 95 percent tetrafluoroethylene; and (ii.) 5, 10, 15, 20, or 25 percent to about 25, 30, 35, 40, 45 or 50 percent (generally 7 to 27 percent) hexafluoropropylene. In some embodiments, the cover layer is selected from the group consisting of Teflon® FEP film available from DuPont, Teflon® PFA film available from DuPont and mixtures thereof. In some embodiments, the cover layer is surface treated to promote better adhesion to the film heating device. Any known surface treatment such as corona or plasma treatment may be used.

A cover layer functions to prevent environmental degradation and to prevent electrical current leakage from the heated surface to adjacent material surfaces. In some embodiments, the cover layer thickness is between and optionally including any two of the following numbers: 12, 20, 30, 40, 50, 60, 70, 80, 90, 100, 110, 120 and 130 microns. In some embodiments, the cover layer thickness is from 12 to 130 microns. The cover layer of the present invention can be nip or press laminated directly on to the film heating device.

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described herein.

When the term "about" is used in describing a value or an end-point of a range, the disclosure should be understood to include the specific value or end-point referred to.

EXAMPLES

Advantages are illustrated in the following examples which do not limit the scope of the claims.

5025 Silver Conductor Conductive silver paste available from E. I. du Pont de Nemours and Company, Wilmington, Del.

Kapton® 200RS100 Two layer electrically conductive polyimide film available from E. I. du Pont de Nemours and Company, Wilmington, Del.

200CLP20 2 MIL (0.002 inch) thick PFA Teflon sheet with surface treatment of both sides to improve film adhesion during heat lamination. Surface treatment is by either corona or plasma treatment. Available from E. I. du Pont de Nemours and Company, Wilmington, Del.

100EKJ 1 MIL (0.001 inch) thick three layer Kapton film construction, where the outer two layers of Kapton are an adhesive polyimide formulation and the core layer is a high modulus polyimide film available from E. I. du Pont de Nemours and Company, Wilmington, Del.

Raven® 16 Carbon black available from Columbian Chemicals Company

CDX 7055U Carbon black available from Columbian Chemicals Company

Example 1

Example 1 illustrates even heating of the film heater.
Heater Layer Construction:
(aluminum plate/100EKJ (cover layer)/Kapton®200RS100 (heater/base film)/PMDA/ODPA//RODA filled with 30 wt % raven 16 (adhesive layer)/Copper (metal foil)/200CLP20 (cover layer))
Preparation of PMDA/ODPA//RODA Filled Polyimide Adhesive Film Nineteen to twenty percent solids in polyamic acid was prepared by reacting anhydrides and amines in DMAC solvent. Formulation used for polyamic acid was PMDA/ODPA//RODA at 20/80//100 mixed in DMAC solvent.

Raven® 16 in DMAC Slurry was prepared by mixing 12 grams of Raven® 16 carbon black into 50 grams of DMAC solvent with a Silverson L4RT-A high shear mixer at 4000-6000 rpm for 5-10 minutes or until carbon filler was wet and dispersed. The carbon slurry was then added to the polyamic acid and mixed again with Silverson L4RT-A high shear mixer at approximately 4000-6000 rpm until 30% by weight is achieved in the polyamic acid. A finishing solution of 6 wt % PMDA monomer in DMAC was added in incremental steps with a 3 mL syringe until a target viscosity 500-1000 Poise was reached.

The slurry was degassed to remove any air bubbles before film casting. The filled finished PMDA/ODPA//RODA polymer is cast directly on to bare copper sheets of approximately 14 inches long×10 inches wide×0.001 inches thick. Sample is then placed onto a hot plate at approximately 80 C to 100 C for solvent drying for about 30 minutes or until at least 70% or higher film solids is achieved (green film state). The filled polyimide green film on copper is then peeled and placed onto a film curing pin frame. The filled polyimide adhesive film with copper is then placed into a Blue M nitrogen purged high temperature oven for curing with ramping conditions of 50° C. per 10 minutes from 100 C to 400 C for 60 minutes and then slowly cooled back to room temperature for another 60 minutes under nitrogen environment. The cured filled polyimide adhesive layer on copper is then cut into desired bus bar strips of approximately 0.125 inches to 0.75 inch widths for lamination.

A clothing iron heater prototype is prepared by vacuum laminating an aluminum plate together with a multilayer stack of 100EKJ film, 200RS100 film, copper bus bars with 30% by weight filled polyimide (described above), and 200CLP20 Teflon. Tetrahedron vacuum lamination press is used to attach the conductive polyimide and copper bars onto 200RS100 film surface and the surrounding layer stack. Vacuum lamination conditions used were 680 F (360 C), pressure of 20-25 tons (40,000 lbs-50,000 lbs), and dwell time of 30 minutes. 100EKJ is used as a dielectric barrier. 200CLP20 is used as a cover layer (moisture barrier). The test samples were suspended in air. Room temperature was 23 degrees centigrade. The voltage was measured using an Extech Instruments True RMS Industrial Multimeter, model EX520. Positive and negative electrical leads with mechanical clamps were used for power attachment to copper bus bars AC Voltage was applied with a Powerstat Variable AC Autotransformer, type 3PN116C, Output: 0-280 VAC & 4 amps.

Figure 6:
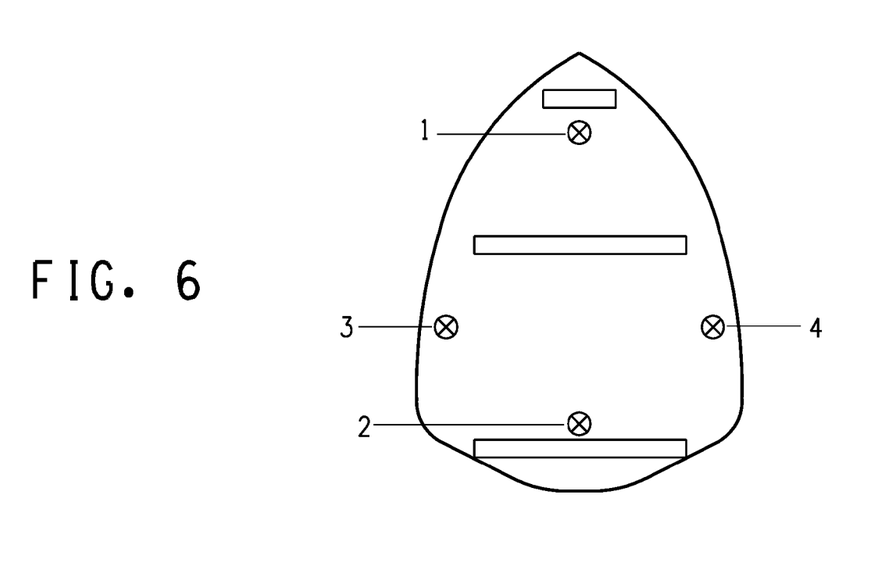
FIG. 6 is a drawing indicating thermal couple placement for example 1.

FIG. 6 illustrates the placement of a first thermal couple 1, a second thermal couple 2, a third thermal couple 3, and a forth thermal couple 4. Temperature values are in degrees centigrade and results are shown in table 1.

TABLE 1

| Step Increase # | Volts (AC) | 1 | 2 | 3 | 4 | Time (mins) | Amperage |
|---|---|---|---|---|---|---|---|
| 1 | 60 | 69 | 61 | 62 | 61 | 2 | 0.91 |
| 2 | 70 | 95 | 85 | 84 | 83 | 2 | 1.07 |
| 3 | 80 | 118 | 104 | 105 | 105 | 2 | 1.24 |
| 4 | 90 | 143 | 124 | 127 | 127 | 2 | 1.40 |
| 5 | 100 | 161 | 139 | 142 | 143 | 2 | 1.55 |
| 6 | 110 | 170 | 152 | 155 | 156 | 2 | 1.72 |
| 7 | 120 | 186 | 161 | 163 | 163 | 2 | 1.88 |
| 8 | 120 | 190 | 165 | 164 | 164 | 10 | 1.88 |

Example 2

Example 2 illustrates constant voltage verses varying copper bus bar (metal foil) length.

The PMDA/OPDA//RODA filled polyimide was prepared as described in example 1. The heater sample of the copper (metal foil)/filled polyimide (adhesive)/Kapton®200RS100 (heater/base film) laminated was prepared with the same vacuum lamination method described in Example 1 with copper bus bars approximately 0.5 inch wide×40 inch length× 0.001 inch thickness and 0.75 inch apart.

Standard 1 MIL (0.001 inch) thick copper was used for passing electrical AC and DC voltage for measurement of voltage drop. Copper strips cut to forty inch lengths and having 0.001 inch thickness were used for passing electrical current. Positive and negative electrical leads with mechanical clamps were used for power attachment to copper bus bars. DC Voltage Applied with an HC Protek DC Power Supply Transformer, model 3003, Output: 0-30 VDC & 3 amps. AC Voltage applied with a Powerstat Variable AC Autotransformer, type 3PN116C, Output: 0-280 VAC & 4 amps. The voltage was measured using an Extech Instruments True RMS Industrial Multimeter, model EX520. Results are shown in table 2.

TABLE 2

| Sample Type | Volts Applied | Measured Volts | Measured Volts | Measured Volts | Measured Volts | Measured Volts |
|---|---|---|---|---|---|---|
| | (DC) at clamps | (DC) at 1.0 inch | (DC) at 10 inches | (DC) at 20 inches | (DC) at 30 inches | (DC) at 40 inches |
| Copper | 5.062 | 5.062 | 5.062 | 5.062 | 5.062 | 5.062 |
| Copper | 10.08 | 10.08 | 10.08 | 10.08 | 10.08 | 10.08 |
| | (AC) at clamps | (AC) at 1.0 inch | (AC) at 10 inches | (AC) at 20 inches | (AC) at 30 inches | (AC) at 40 inches |
| Copper | 5.07 | 5.07 | 5.07 | 5.07 | 5.07 | 5.07 |
| Copper | 10.20 | 10.20 | 10.20 | 10.20 | 10.20 | 10.20 |
| Copper | 20.40 | 20.40 | 20.40 | 20.40 | 20.40 | 20.40 |

Comparative Example 1

Comparative Example 1 illustrates 5025 paste voltage drop across bus bar length.

5025 conductive silver paste is screen printed/masked onto the surface of Kapton® 200RS100 film. Paste thickness was printed on to a 0.001 inch target thickness, 0.5 inches wide, 40 inches in length, and with a 0.75 inch bus bar gap (same as described in example 2). The 200RS100 5025 silver paste is then dried/cured at 120 C for 15 minutes on a lab hot plate. Electrical current was supplied by one variable DC voltage power supply and one variable AC voltage power supply. Positive and negative electrical leads with mechanical clamps were used for power attachment to 5025 silver bus bars. DC Voltage was applied with an HC Protek DC Power Supply Transformer, model 3003, Output: 0-30 VDC & 3 amps. AC Voltage applied with a Powerstat Variable AC Autotransformer, type 3PN116C, Output: 0-280 VAC & 4 amps. The voltage was measured using an Extech Instruments True RMS Industrial Multimeter, model EX520. Measurements were taken in a same manner for copper bus bars shown Example 2. Results are shown in table 3.

TABLE 3

| Sample Type | Volts Applied | Measured Volts | Measured Volts | Measured Volts | Measured Volts | Measured Volts |
|---|---|---|---|---|---|---|
| | (DC) at clamps | (DC) at 1.0 inch | (DC) at 10 inches | (DC) at 20 inches | (DC) at 30 inches | (DC) at 40 inches |
| 5025 Paste | 5.062 | 4.688 | 3.581 | 2.809 | 2.369 | 2.225 |
| 5025 Paste | 10.08 | 9.20 | 7.01 | 5.436 | 4.563 | 4.282 |
| | (AC) at clamps | (AC) at 1.0 inch | (AC) at 10 inches | (AC) at 20 inches | (AC) at 30 inches | (AC) at 40 inches |
| 5025 Paste | 5.07 | 4.34 | 3.33 | 2.57 | 2.11 | 2.04 |
| 5025 Paste | 10.20 | 8.48 | 6.47 | 5.03 | 4.20 | 3.97 |
| 5025 Paste | 20.40 | 16.68 | 12.25 | 9.39 | 7.79 | 7.35 |

Example 3

Example 3 illustrates high temperature stability of carbon filled Polyimides.

The filled polyimide and heater sample were prepared as in Example 1. When attached a PFA Teflon cover layer temperature of 310 C, pressure of 10 tons, and dwell time of 15 minutes are used. Electrical leads with mechanical clamps were attached directly onto the copper bus bars (one end only) with conductive KJ and then attached to a variable voltage AC or DC power supply.

DC Voltage applied with an HC Protek DC Power Supply Transformer, model 3003, Output: 0-30 VDC & 3 amps. AC Voltage Applied with a Powerstat Variable AC Autotransformer, type 3PN116C, Output: 0-280 VAC & 4 amps. The voltage was measured using an Extech Instruments True RMS Industrial Multimeter, model EX520. Results are shown in table 4.

Comparative Example 2

Comparative Example 2 illustrates the 5025 paste does not have high temperature stability.

Heaters constructed with 5025 silver paste are made up by screen printing or lab masking for desired bus bar length, width, and thickness. In the following example the Kapton®200RS100 (heater) sample used for voltage variation measurement was made up by lab masking. The samples were made by constructing three parallel bus bars of 40.0 inches length×0.5 inches wide×0.001 inches thickness. The paste was applied by a squeegee foam brush and then the paste was cured at 120 C for 15 minutes using a Thermolyne Type 2200 hot plate with temperature remote control. Electrical leads with mechanical clamps were attached directly onto the cured 5025 silver paste bars (one end only) then attached to a variable voltage AC or DC power supply. DC Voltage Applied with an HC Protek DC Power Supply Transformer, model 3003, Output: 0-30 VDC & 3 amps. AC Voltage Applied with a Powerstat Variable AC Autotransformer, type 3PN116C, Output: 0-280 VAC & 4 amps. The voltage was measured using an Extech Instruments True RMS Industrial Multi-meter, model EX520). Results are shown in table 4.

TABLE 4

|  | Example 3 PMDA/OPDA/RODA with filler | Comparative ex. 2 5025 paste |
|---|---|---|
| 180° C. | No charring | No visible charring short term |
| 200° C. | Some oxidation of copper without coverlay. | Oxidation plus discoloring of paste surface, browning color |
| 250° C. | More oxidation & browning of copper is present at +250 C. | Severe discoloring & degradation of silver paste bars. |
| 300° C. | Oxidation of Cu, but no electrical problems | Cracking, flaking, oxidation/browning, paste begins to breakdown |
| 400° C. | Oxidation of Cu, KJ begins to delaminate and peel from 200RS100 surface. | No data - paste fails at 300° C. |

Example 4

Example 4 illustrates variance of peel strength as a function of filler loading levels.

A CDX 7055U carbon slurry was prepared by adding the following ratios of material together: 73.25% DMAC/9.5% CDX 7055U Carbon Black filler/13.06% PMDA/ODA prepolymer/4.19% PMDA/BPDA//ODA/PPD prepolymer. This CDX 7055U slurry was added into polyamic acid prepolymer to achieve filler loading of 10%, 20% and 30% by weight. Milling and high shear mixing were used for complete uniform particle dispersion of the slurry. Particle size analysis data was targeted for a particle size of approximately 1 micron diameter. A scattering light Horiba particle size analyzer was used was used for particle size measurement.

A second adhesive of approximately 800 grams was prepared in a similar manner as Example 1 producing a PMDA/ODPA//RODA/HMD polyamic acid of the following ratios 20/80//70/30 in DMAC solvent. PMDA/ODPA//RODA/HMD anhydrides and amines were 20% solids by weight in DMAC.

Two types of adhesive pre-polymer PMDA/ODPA//RODA/HMD and PMDA/ODPA//RODA (prepared as in Example 1) formulations were filled with target loading of 0%, 10%, 20%, and 30% for adhesion strength examination. Samples were finished to target viscosities of 400 to 600 Poise using 6% PMDA (by weight) in DMAC solvent (finishing solution). All sample slurries and combination mixing were performed in a dry glove box environment (nitrogen purged). All samples were degassed by use of a vacuum chamber and then cast into sheet forms of approximately 8 inches×11 inches×0.001 inches (see Example 1 for film casting on glass). Filled polyimide samples were dried on a Thermolyne Type 2200 hot plate with temperature remote control at 80 C to 100 C for about 30 minutes to approximately 70% solids (green film state). Film samples were then peeled from the glass plate surface and placed onto film pin frames for high temperature curing. Each film and pin frame were placed into a Blue M oven and cured initially from 120 C to 320 C at about 5 C/min rise for approximately 45 minutes. Then PMDA/OPDA//RODA filled polyimide samples were placed into another Blue M oven at 400 C for five minutes for high temperature final cure. PMDA/OPDA//RODA/HMD filled polyimide samples were place into a Blue M oven at 350 C for five minutes for maximum temperature curing.

Cured film samples were then removed from pin frames and mounted between copper foil sheets approximately 10 inches×12 inches. Copper foils with filled polyimide samples were then place into a Tetrahedron vacuum lamination press for copper clad lamination. Vacuum press conditions used for all PMDA/OPDA//RODA filled polyimide copper clad samples were temperature of 680 F (360 C) at 25 tons pressure for a dwell time of 30 minutes. Vacuum press conditions used for all PMDA/OPDA//RODA/HMD copper clad samples were temperature of 572 F (300 C) at 25 tons pressure for a dwell time of 30 minutes. Test sample widths cut to 0.5 inch using a JDC Precision Cutter made by Thwing-Albert Instruments. Adhesion strength was measured using a Instron Model 3345 single beam column with a German Wheel attachment having PC Software from Instron Bluehill. Results are shown in table 5.

TABLE 5

| Sample Carbon Loading (%) | Sample Type | Average Adhesion Strength (lb/in) |
|---|---|---|
| 0 | PMDA/OPDA//RODA | 10.306 |
| 10 | PMDA/OPDA//RODA | 8.948 |
| 20 | PMDA/OPDA//RODA | 8.197 |
| 30 | PMDA/OPDA//RODA | 2.466 |
| 0 | PMDA/OPDA//RODA/HMD | 5.507 |
| 10 | PMDA/OPDA//RODA/HMD | 4.323 |
| 20 | PMDA/OPDA//RODA/HMD | 1.852 |

Note that not all of the activities described above in the general description or the examples are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:
1. A film based heating device comprising:
A) a base film having a base film inner surface and a base film outer surface, said base film comprising:
a) a base film aromatic polyimide in an amount from 55 to 90 weight percent based upon the total weight of said base film,
b) a base film electrically conductive filler in an amount from 10 to 45 weight percent based upon the total weight of said base film;

B) a first laminate comprising:
  a) a first laminate adhesive layer having a first laminate adhesive layer inner surface bonded to said base film inner surface and a first laminate adhesive layer outer surface, said first laminate adhesive layer containing:
    i. 55 to 90 weight percent of a first laminate adhesive layer thermoplastic polyimide, wherein 70 to 100 mole percent of said first laminate adhesive layer thermoplastic polyimide is derived from at least one aromatic diamine and at least one aromatic dianhydride, based upon the total weight of said first laminate adhesive layer,
    ii. 10 to 45 weight percent of a first laminate adhesive layer electrically conductive filler based upon the total weight of said first laminate adhesive layer,
  b) a first laminate metal foil having: i. a first laminate metal foil inner surface bonded to said first laminate adhesive layer outer surface; and ii. a first laminate metal foil outer surface,
said first laminate metal foil having a thickness from 5 to 200 microns;
C) a second laminate comprising:
  a) a second laminate adhesive layer having a second laminate adhesive layer inner surface bonded to said base film inner surface and a second laminate adhesive layer outer surface, said second laminate adhesive layer containing:
    i. 55 to 90 weight percent of a second laminate adhesive layer thermoplastic polyimide, wherein 70 to 100 mole percent of said first laminate adhesive layer thermoplastic polyimide is derived from at least one aromatic diamine and at least one aromatic dianhydride, based upon the total weight of said second laminate adhesive layer,
    ii. 10 to 45 weight percent of a second laminate adhesive layer electrically conductive filler based upon the total weight of said second laminate adhesive layer,
  b) a second laminate metal foil having: i. a second laminate metal foil inner surface bonded to said second laminate adhesive layer outer surface; and ii. a second laminate metal foil outer surface,
said second laminate metal foil having a thickness from 5 to 200 microns;
  wherein at least a portion of said first laminate and at least a portion of said second laminate are spaced apart and connected to each other by at least a portion of said base film.

2. A film based heating device in accordance with claim 1 additionally comprising a secondary base film having a secondary base film outer surface and a secondary base film inner surface, said secondary base film inner surface being directly adhered to said base film outer surface, said secondary base film comprising a secondary base film aromatic polyimide.

3. A film based heating device in accordance with claim 2 wherein said secondary base film aromatic polyimide is derived from pyromellitic dianhydride and 4,4'-diaminodiphenyl ether.

4. A film based heating device in accordance with claim 1, comprising a cover layer, wherein said cover layer is selected from the group consisting of: tetrafluoroethylene hexafluoropropylene copolymer (FEP), perfluoroalkoxy polymer (PFA) and mixtures thereof.

5. A film based heating device in accordance with claim 4 wherein said cover layer encapsulates at least said base film, said first laminate adhesive layer, said first laminate metal foil, said second laminate adhesive layer and said second laminate metal foil.

6. A film based heating device in accordance with claim 1 wherein at least 70 mole percent of said base film aromatic polyimide is derived from pyromellitic dianhydride and 4,4'-diaminodiphenyl ether.

7. A film based heating device in accordance with claim 1 wherein said first laminate adhesive layer thermoplastic polyimide is also derived from 1 to 30 mole percent of a non-aromatic diamine selected from the group consisting of aliphatic diamine, cycloaliphatic diamine and any combination thereof.

8. A film based heating device in accordance with claim 1 wherein said second laminate adhesive layer thermoplastic polyimide is also derived from 1 to 30 mole percent of a non-aromatic diamine selected from the group consisting of aliphatic diamine, cycloaliphatic diamine and any combination thereof.

9. A film based heating device in accordance with claim 1, wherein said first laminate adhesive layer thermoplastic polyimide and said second laminate adhesive layer thermoplastic polyimide are also derived from 1 to 30 mole percent of a non-aromatic diamine selected from the group consisting of aliphatic diamine, cycloaliphatic diamine and any combination thereof.

10. A film based heating device in accordance with claim 9 wherein said aliphatic diamine is hexamethylene diamine.

11. A film based heating device in accordance with claim 1 wherein said first laminate adhesive layer electrically conductive filler and said second laminate adhesive layer electrically conductive filler are the same.

12. A film based heating device in accordance with claim 1 wherein said base film electrically conductive filler, said first laminate adhesive layer electrically conductive filler and said second laminate adhesive layer electrically conductive filler are the same.

13. A film based heating device in accordance with claim 1 wherein said base film electrically conductive filler, said first laminate adhesive layer electrically conductive filler and said second laminate adhesive layer electrically conductive filler each comprise carbon black.

14. A film based heating device in accordance with claim 1, wherein said first laminate metal foil and said second laminate metal foil are the same.

15. A film based heating device in accordance with claim 1, wherein said first laminate metal foil and said second laminate metal foil comprise copper.

16. A film based heating device in accordance with claim 1, wherein said base film comprises from 1 to 15 weight percent of non-electrically conductive filler.

17. A film based heating device in accordance with claim 1, wherein said first laminate adhesive layer, said second laminate adhesive layer or both said first laminate adhesive layer and said second laminate adhesive layer comprises from 1 to 15 weight percent of non-electrically conductive filler.

18. A film based heating device in accordance with claim 1, wherein said first laminate adhesive layer thermoplastic polyimide and said second laminate adhesive layer thermoplastic polyimide are derived in part from 4,4'-oxydiphthalic anhydride, pyromellitic dianhydride and 1,3-bis(4-aminophenoxy)benzene.

19. A film based heating device in accordance with claim 1, wherein said first laminate adhesive layer thermoplastic polyimide and said second laminate adhesive layer thermoplastic polyimide are each derived from 4,4'-oxydiphthalic anhydride, pyromellitic dianhydride, 1,3-bis(4-aminophenoxy)benzene and hexamethylene diamine.

* * * * *